Nov. 15, 1927.
E. N. ROTH
1,649,616
FLEXIBLE PIPE JOINT
Filed Jan. 11, 1926
2 Sheets-Sheet 1
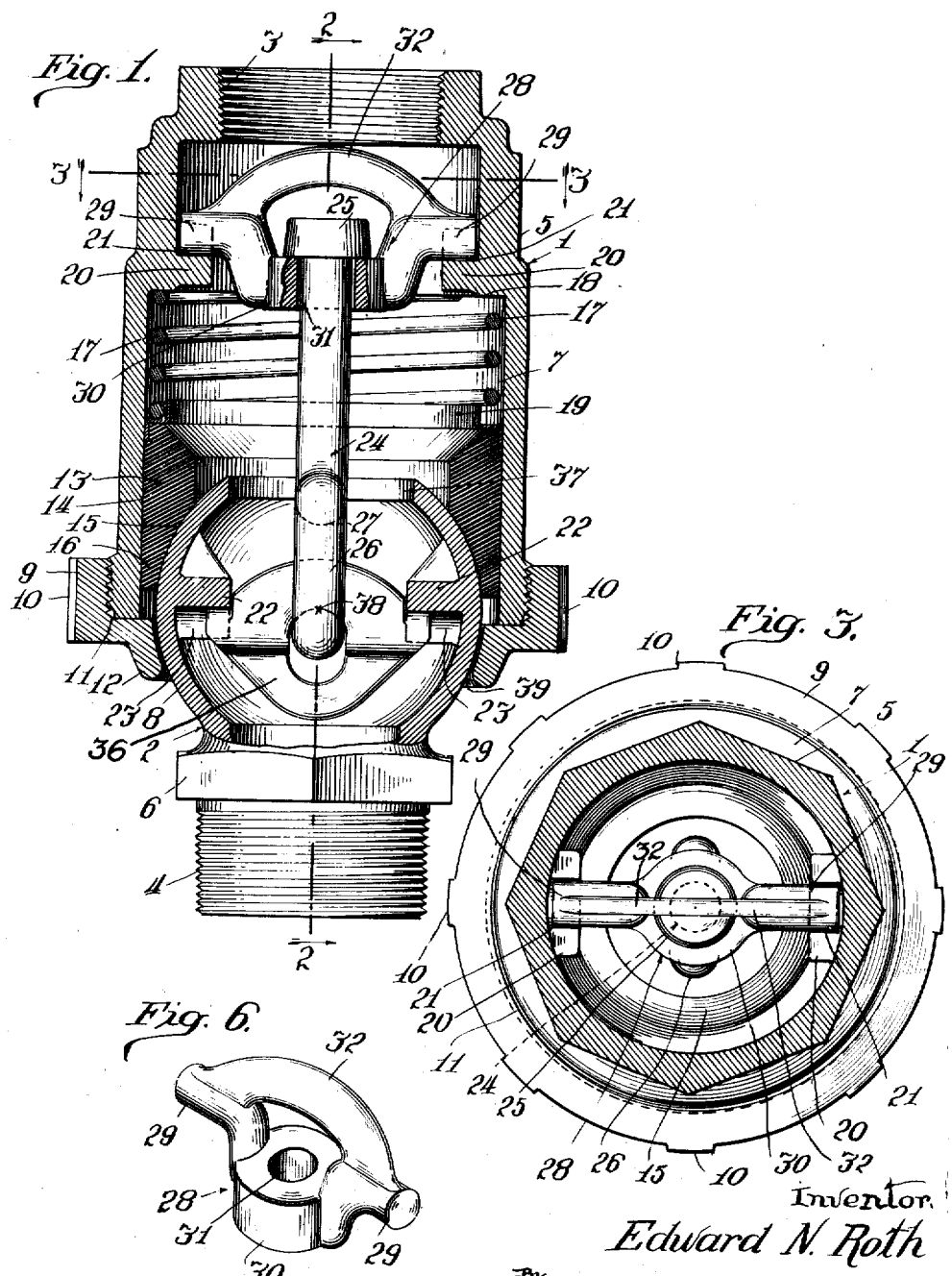
Inventor.
Edward N. Roth Nov. 15, 1927.  
E. N. ROTH  
1,649,616  
FLEXIBLE PIPE JOINT  
Filed Jan. 11, 1926   2 Sheets-Sheet 2
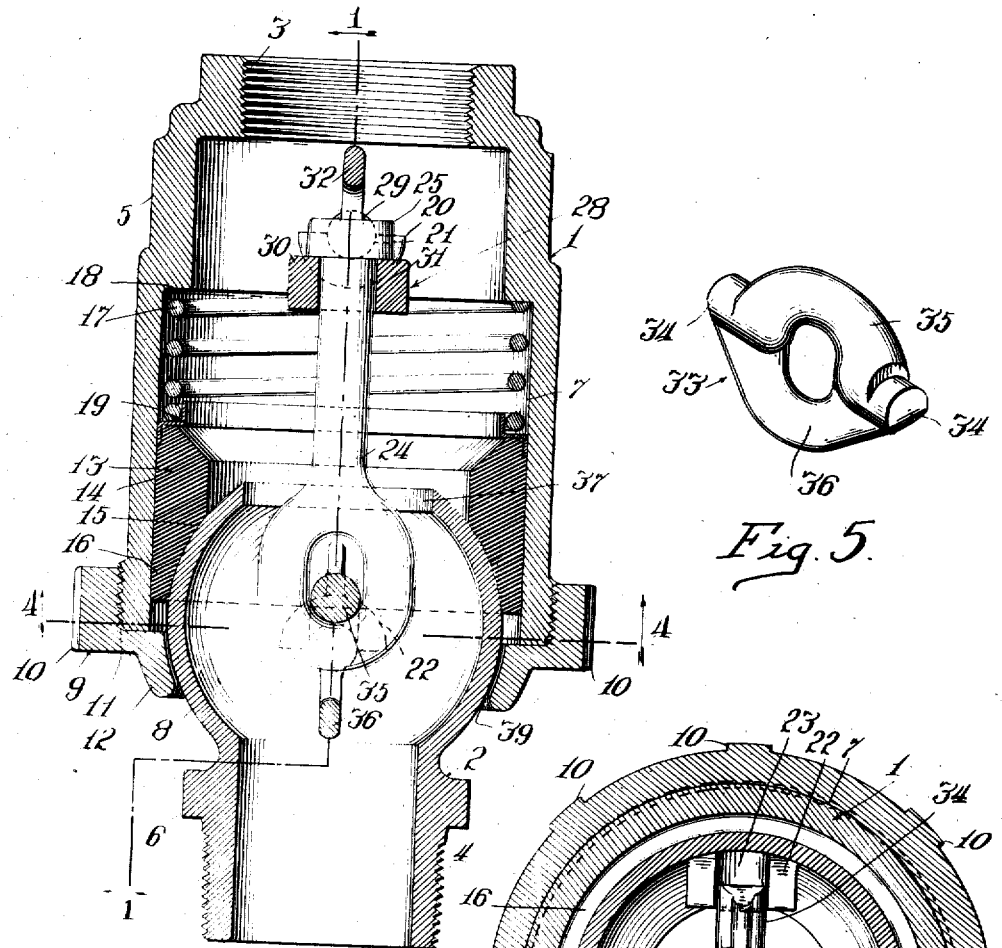
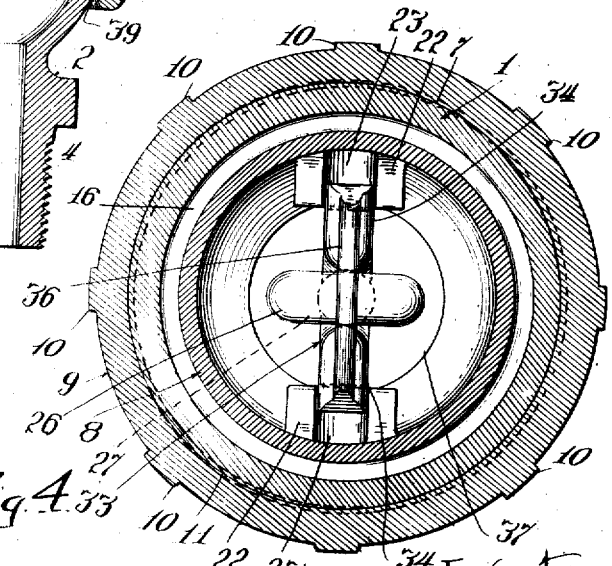
Inventor
Edward N. Roth
By Barnett & Truman
Attorneys Patented Nov. 15, 1927.

1,649,616

UNITED STATES PATENT OFFICE.

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS.

FLEXIBLE PIPE JOINT.

Application filed January 11, 1926. Serial No. 80,555.

This invention relates to a flexible pipe joint, particularly suitable for use in the metallic conduit which connects the train pipes on adjacent cars of a railway train. The invention will be described as applied to the coupling or connection between the steam train pipes of a railway train, the invention having special utility in this relation. It should be understood, however, that the novel pipe joint may be employed in other flexible metallic conduits wherever an effectively sealed joint permitting universal swinging movement is desired.

The primary object of the invention is to provide a universal pipe joint, more particularly of the ball-and-socket type, which will be flexible under high internal pressures, which will be furnished with effective sealing means between the articulated members of the joint, and which includes means for articulating the members of the joint, one within the other, such means being positioned within said members. This latter feature is advantageous because by arranging the articulation of the joint within the conduit members, said means is protected from injury, and the outside diameter of the joint is reduced to a minimum. The exterior contour of the joint is compact, and presents substantially no projections or undesirable irregularities.

Another object is to provide a joint of this type, comprising a few simple parts, which may be economically made and are easily assembled.

Another object is to provide a joint of this type in which the interiorly positioned articulating means is simple and compact, and presents a small obstructing surface to the flow of fluid through the joint.

Another object is to provide a joint of this type which may be easily and quickly assembled or dis-assembled, whereby one or more of the parts may be replaced or repaired.

Other objects and advantages of the invention will be apparent from the following description of one approved form of the device.

In the accompanying drawings:

Fig. 1 is a longitudinal central section through the joint, the view being taken substantially on the line 1—1 of Fig. 2.

Fig. 2 is a similar view, taken at right angles to Fig. 1, and substantially on the line 2—2 of Fig. 1.

In both of Figs. 1 and 2, portions of the inside articulating connection are shown in elevation.

Fig. 3 is a transverse section taken substantially on the line 3—3 of Fig. 1.

Fig. 4 is a transverse section taken substantially on the line 4—4 of Fig. 2.

Fig. 5 is a perspective view of the ball-supporting link.

Fig. 6 is a perspective view of the bolt-supporting link.

Referring to the drawings, the reference characters 1 and 2 designate the two conduit members of the joint, one end of the member 1 being internally threaded at 3 to connect with one section of the conduit pipe, and the other member 2 being exteriorly threaded at 4 to screw into the other section of the pipe. Portions of the members 1 and 2 are made octagonal, or of other irregular peripheral contour, as at 5 and 6, respectively, in order to facilitate the engagement therewith of a suitable tool or wrench, when connecting these members with the respective pipe sections. The free end portion of the body member 1, which is preferably a malleable iron casting, is interiorly cylindrical, as at 7. The free end portion of the conduit member 2, which is preferably a brass casting, is formed as a hollow ball member 8 of such diameter that it may be freely inserted within the cylindrical recess 7 in body member 1. A nut 9 having exterior wrench-engaging projections 10, is interiorly threaded as at 11, to engage with the free outer end of body member 1. The inwardly projecting skirt 12 of nut 9 is shaped to fit loosely about the outer portion of ball member 8. It should be noted that there is normally no engagement at any time between the ball member 8 and either the inner surface of nut 12 or the inner cylindrical surface 7 of body member 1.

A gasket 13, of suitable composition material, has a cylindrical outer surface 14 adapted to fit snugly but slidably within the cylindrical recess 7, and a suitably curved end portion 15 adapted to fit against the spherical surface of ball 8. The narrow outer end 16 of this annular gasket is adapted to be forced between the ball and socket members and form a steam-tight joint therebetween. A coil spring 17 is normally compressed between a shoulder 18 projecting inwardly from conduit member 1, and an annular metallic follower 19 at the inner end of gasket 13. This spring 17 assists the fluid pressure within the conduit in holding the gasket 13 firmly in position between the ball and socket members to seal the joint. It also assists in holding in place the articulating connection hereinafter described.

A pair of diametrically oppositely disposed lugs 20 project inwardly from the inner walls of socket member 1, at the rear end of cylindrical recess 7. Each lug 20 is formed with a semi-cylindrical socket 21 opening inwardly and toward the rear, screw threaded, end of socket member 1. A similar pair of lugs 22 are formed within the hollow interior of ball member 8, the open semi-cylindrical recesses 23 in these lugs 22 opening in the opposite direction from the recesses 21 in lug 20, when the flexible joint is assembled. The articulating bolt 24 comprises a longitudinally extending cylindrical stem portion, formed at one end with an enlarged head 25, and at the other end with a loop member 26 having an elongated opening 27. The bolt-supporting link 28 comprises a pair of laterally extending arms 29, having cylindrical ends which rest within the sockets 21 in lugs 20. The main body portion 30 of the link has a central cylindrical recess 31 adapted to surround the stem of bolt 24 behind the head 25. The link also comprises an arch member 32 which bridges the gap between arms 29, above the head 25, serving to strengthen the link and prevent excessive longitudinal movement of bolt 24 through recess 31 in the link. The ball-supporting link 33 comprises a pair of opposite side arms 34, whose cylindrical ends are adapted to engage within the recesses 23 in lugs 22, and a transverse cylindrical portion 35 fitting loosely within the elongated aperture 27 in loop 26 of the bolt. Another transverse portion 36 of the link bridges the space between side arms 34, serving to strengthen the link and prevent disengagement of this link from the loop 26 of the bolt 24. The bolt 24 and the two links 28 and 33, which three members comprise the articulating connection, are preferably cast together, in the form shown, so that although freely interlocked with one another, they form substantially a single unit when assembling or disassembling the joint.

In order to assemble this pipe joint, the articulating connection is first inserted within socket member 1, and the arms 29 hooked within the recesses 21. The spring 17, follower 19, and gasket 13 are then inserted within the cylindrical recess 7 in the order named. The ball member 8 is now inserted within the outer end of gasket 13, and the gasket is forced in against the spring 17 until the ball 8 is within the socket member, substantially as shown in the drawings. By screwing nut 9 in place upon the outer end of socket member 1, the parts may be temporarily held in this position. It will be noted that the ball-supporting link 33 may tilt freely about the loop 26 of the bolt, so that its ends may be passed successively through the open end 37 of ball member 8. The ball member 8 is now pushed still further into the socket 1, further compressing the spring 17, and rotated until the lugs 22 are in line with the arms 34 on link 33, the engagement of these arms 34 with the recesses 23 being accomplished with the aid of a suitable pair of pliers or other tool inserted through the open end of the conduit member 2. When pressure is released from the conduit member 2, the gasket 13 and ball 8 will be pushed out by the compressed spring 17 until the members of the articulating connection are elongated to their full extent. Further outward movement of the ball 8 is prevented by the engagement of the arms 29 in lugs 20, the engagement of head 25 of the bolt with the cross member 30 of link 28, the engagement of loop 26 of the bolt with cross member 35 of link 33, and the engagement of arms 34 of link 33 with the lugs 22. It will be noted that bolt 24 is freely swiveled within the opening 31 in link 28 so that ball member 8 of conduit member 2 may be freely rotated about the longitudinal axis of the pipe connection. When the parts are assembled, as above described, the point of engagement 38 of the loop 26 with the link member 35, will be positioned at the center of ball 8. The ball can be swung in all directions about this point as a center, such movements being permitted by the rocking or sliding movement of loop 26 on link 35, and also if necessary, by the pivoting of arms 34 within the recesses 23. The parts are all held yieldably in this assembled position by the spring 17, which is aided, when the joint is in service, by the fluid pressure existing within the pipe connection, which tends to force the gasket 13 and ball 8 outwardly from the socket.

It will be noted that when in assembled position, there is a clearance space 39 between the outer surface of ball 8 and the skirt 12 of nut 9, also the ball does not contact with the socket member, since the gasket 13 is interposed therebetween. The entire longitudinal stress is taken up by the articulating connections 24, 28 and 33, which transmit the pull from lugs 20 in the socket member 1 to the lugs 22 in the ball member 8. The parts of this joint are freely replaceable and interchangeable, and the joint can be quickly dis-assembled by removing the nut 9, and then compressing spring 17 by forcing in the ball 8 so that one or the other of the links 28 or 33 can be disengaged from the lugs 22 or 20, after which all of the parts will freely slip out from one another. Any one of the parts can then be repaired or replaced and the joints quickly re-assembled by a reversal of this process. It is understood that the articulating connection comprising the bolt 24 and the two cross links is considered as a single unit, and when worn or broken, a new unit of this type will be placed within the connection. However, these three parts might be made separable, by omitting the bridging links 32 and 36, but for ease of handling and assembly it is preferred to have them joined as above described.

I claim:

1. In a flexible pipe joint of the ball-and-socket type, a pair of interfitting, hollow, ball and socket members, means for sealing the joint between the members, and means within the joint for connecting the ball and socket members while permitting free oscillatory movement of the ball about its own center, comprising a transverse link detachably engaged with open recesses in the inner walls of the ball, a similar link detachably engaged with similar open recesses in the inner walls of the socket, said socket recesses having their open sides directed away from the ball recesses, and the ball recesses having their open sides directed away from the socket recesses, and a supporting bolt pivotally connected with each of the links and holding them in engagement with the recesses, the links and bolt being bodily removable from the flexible joint without withdrawing the ball member from the socket member.

2. In a flexible pipe joint of the ball-and-socket type, a pair of interfitting, hollow, ball and socket members, means for sealing the joint between the members, and means within the joint for connecting the ball and socket members while permitting free oscillatory movement of the ball about its own center, comprising a transverse link detachably engaged with open recesses in the inner walls of the ball, a similar link detachably engaged with similar open recesses in the inner walls of the socket, said socket recesses having their open sides directed away from the ball recesses, and the ball recesses having their open sides directed away from the socket recesses, and a supporting bolt connected at one end with the link in the socket, and having a loop at the other end, in which loop the link in the ball has a rocking engagement, the bolt holding the links in engagement with the recesses, the links and bolt being bodily removable from the flexible joint without withdrawing the ball member from the socket member.

3. In a flexible pipe joint of the ball-and-socket type, a pair of interfitting, hollow, ball and socket members, means for sealing the joint between the members, and means within the joint for connecting the ball and socket members while permitting free oscillatory movement of the ball about its own center, and free rotary movement about the longitudinal axis of the joint, comprising a link detachably engaged with open recesses in the inner walls of the ball, a similar link detachably engaged with similar open recesses in the inner walls of the socket, said socket recesses having their open sides directed away from the ball recesses, and the ball recesses having their open sides directed away from the socket recesses, and a supporting bolt pivoted at one end within the link in the socket for rotation about its longitudinal axis, and having a rocking connection at its other end with the link in the ball, the bolt holding the links in engagement with the recesses, the links and bolt being bodily removable from the flexible joint without withdrawing the ball member from the socket member.

4. In a flexible pipe joint of the ball-and-socket type, a pair of interfitting, hollow, ball and socket members, means for sealing the joint between the members, and means within the joint for connecting the ball and socket members while permitting free oscillatory movement of the ball about its own center, and free rotary movement about the longitudinal axis of the joint, comprising a link detachably engaged with open recesses in the inner walls of the ball, a similar link detachably engaged with similar open recesses in the inner walls of the socket, said socket recesses having their open sides directed away from the ball recesses, and the ball recesses having their open sides directed away from the socket recesses, and a supporting bolt pivoted at one end within the link in the socket for rotation about its longitudinal axis, and having a loop at its other end in which the link in the ball has a rocking engagement, the bolt holding the links in engagement with the recesses, the links and bolt being bodily removable from the flexible joint without withdrawing the ball member from the socket member.

5. In a flexible pipe joint of the ball-and-socket type, a pair of interfitting, hollow, ball and socket members, means for sealing the joint between the members, and means within the joint for connecting the ball and socket members while permitting free oscillatory movement of the ball about its own center, and free rotary movement about the longitudinal axis of the joint, comprising a link detachably engaged with open recesses in the inner walls of the ball, a similar link detachably engaged with similar open recesses in the inner walls of the socket, said socket recesses having their open sides directed away from the ball recesses, and the ball recesses having their open sides directed away from the socket recesses, and a supporting bolt having an enlarged head at one end and an integral loop at the other end, the link in the socket being pivotally connected with the bolt back of the enlarged head, and the link in the ball having a rocking engagement within the loop, the bolt holding the links in engagement with the recesses, the links and bolt being bodily removable from the flexible joint without withdrawing the ball member from the socket member.

6. In a flexible pipe joint of the ball-and-socket type, a pair of interfitting, hollow, ball and socket members, means for sealing the joint between the members, and means within the joint for connecting the ball and socket members while permitting free oscillatory movement of the ball about its own center, and free rotary movement about the longitudinal axis of the joint, comprising a link freely engaged with the inner walls of the ball, a similar link freely engaged with the inner walls of the socket, and a supporting bolt having an enlarged head at one end and an integral loop at the other end, the link in the socket being pivotally connected with the bolt back of the enlarged head, and the link in the ball having a rocking engagement within the loop, and means integral with the two links for preventing disengagement of the links from the head and loop respectively.

7. In a flexible pipe joint of the ball-and-socket type, a pair of interfitting, hollow, ball and socket members, means for sealing the joint between the members, and articulating means within the joint for connecting the ball and socket members, comprising a pair of oppositely disposed lugs within the ball member, a similar pair of lugs within the socket member, a pair of links, one engageable with each pair of lugs, and a bolt pivotally connecting the two links, and means integral with the links for preventing disengagement of the bolt from the links.

8. In a flexible pipe joint of the ball-and-socket type, a pair of interfitting, hollow, ball and socket members, means for sealing the joint between the members, and means within the joint for connecting the ball and socket members, while permitting free oscillatory movement of the ball about its own center, and free rotary movement about the longitudinal axis of the joint, comprising a link freely engaged with the inner walls of the ball, a similar link freely engaged with the inner walls of the socket, a bolt pivotally connecting the two links, and means integral with the links for preventing disengagement of the bolt from the links.

9. In a flexible pipe joint of the ball-and-socket type, a pair of interfitting, hollow, ball and socket members, means for sealing the joint between the members, and articulating means within the joint for connecting the ball and socket members, comprising a pair of oppositely disposed lugs within the ball member, a similar pair of lugs within the socket member, a pair of links, one engageable with each pair of lugs, the lugs in the socket having open recesses directed away from the ball, and the lugs in the ball having similar but oppositely directed open recesses, a pair of links, one engageable freely at its ends in each pair of open recesses, and a bolt pivotally connected at its ends with the two links, the sealing means and the bolt cooperating to prevent disengagement of the links from the recesses when the parts of the point are assembled, but the links and bolt being removable from the flexible joint without withdrawing the ball member from the socket member.

10. In a flexible pipe joint of the ball-and-socket type, a pair of interfitting, hollow, ball and socket members, means for sealing the joint between the members, and articulating means within the joint for connecting the ball and socket members, comprising a pair of oppositely disposed lugs within the ball member, a similar pair of lugs within the socket member, a pair of links, one engageable with each pair of lugs, the lugs in the socket having open recesses directed away from the ball, and the lugs in the ball having similar but oppositely directed open recesses, a pair of links, one engageable freely at its ends in each pair of open recesses, and a bolt permanently connected at its ends with the respective links, the connection with the link in the socket permitting rotation of the bolt about its longitudinal axis, and the connection with the link in the ball permitting universal rocking movement between the respective members, the sealing means also serving to hold the links against disengagement from the recessed lugs.

11. In a flexible pipe joint of the ball-and-socket type, a pair of interfitting, hollow, ball and socket members, means for sealing the joint between the members, and articulating means within the joint for connecting the ball and socket members, comprising a pair of oppositely disposed lugs within the ball member, a similar pair of lugs within the socket member, a pair of links, one engageable with each pair of lugs, the lugs in the socket having open recesses directed away from the ball, and the lugs in the ball having similar but oppositely directed open recesses, a pair of links, one engageable freely at its ends in each pair of open recesses, and a bolt having a head at one end permanently engaged with the socket link so as to permit rotation of the bolt about its longitudinal axis, and the bolt having a loop at the other end permanently engaged in the ball-link whereby universal rocking movement is permitted between these members, the sealing means also serving to hold the links in place within the recessed lugs.

12. A flexible pipe joint, comprising a pair of conduit members, one having an exteriorly spherical end portion positioned within the interiorly cylindrical end portion of the other, a gasket arranged slidably within the cylindrical portion of the one member and designed to bear between this member and the spherical end of the other member to seal the joint therebetween, there being a plurality of inwardly projecting lugs within the cylindrical member, and similar lugs within the spherical member, and an articulating link connection for holding the spherical member within the cylindrical member against the gasket but permitting universal pivoting movement of the spherical member about its own center, the link connection comprising a pair of transverse links adapted to engage freely behind the lugs, and a supporting bolt articulated at its ends within the links, and spring means for pressing the gasket yieldably between the members and for holding the articulating connection in engagement with the members.

13. A flexible pipe joint, comprising a pair of conduit members, one having an exteriorly spherical end portion positioned within the interiorly cylindrical end portion of the other, a gasket arranged slidably within the cylindrical portion of the one member and designed to bear between this member and the spherical end of the other member, means for pressing the gasket yieldably between the members to seal the joint therebetween, there being a plurality of inwardly projecting lugs within the cylindrical member, and similar lugs within the spherical member, and an articulating link connection for holding the spherical member within the cylindrical member against the gasket but permitting universal pivoting movement of the spherical member about its own center, the link connection comprising a pair of transverse links adapted to engage loosely behind the lugs, and a supporting bolt articulated at its ends within the links, the yieldable means for holding the gasket also holding the links in position against the lugs.

EDWARD N. ROTH.

bolt about its longitudinal axis, and the bolt having a loop at the other end permanently engaged in the ball-link whereby universal rocking movement is permitted between these members, the sealing means also serving to hold the links in place within the recessed lugs.

12. A flexible pipe joint, comprising a pair of conduit members, one having an exteriorly spherical end portion positioned within the interiorly cylindrical end portion of the other, a gasket arranged slidably within the cylindrical portion of the one member and designed to bear between this member and the spherical end of the other member to seal the joint therebetween, there being a plurality of inwardly projecting lugs within the cylindrical member, and similar lugs within the spherical member, and an articulating link connection for holding the spherical member within the cylindrical member against the gasket but permitting universal pivoting movement of the spherical member about its own center, the link connection comprising a pair of transverse links adapted to engage freely behind the lugs, and a supporting bolt articulated at its ends within the links, and spring means for pressing the gasket yieldably between the members and for holding the articulating connection in engagement with the members.

13. A flexible pipe joint, comprising a pair of conduit members, one having an exteriorly spherical end portion positioned within the interiorly cylindrical end portion of the other, a gasket arranged slidably within the cylindrical portion of the one member and designed to bear between this member and the spherical end of the other member, means for pressing the gasket yieldably between the members to seal the joint therebetween, there being a plurality of inwardly projecting lugs within the cylindrical member, and similar lugs within the spherical member, and an articulating link connection for holding the spherical member within the cylindrical member against the gasket but permitting universal pivoting movement of the spherical member about its own center, the link connection comprising a pair of transverse links adapted to engage loosely behind the lugs, and a supporting bolt articulated at its ends within the links, the yieldable means for holding the gasket also holding the links in position against the lugs.

EDWARD N. ROTH.

Certificate of Correction.

Patent No. 1,649,616. Granted November 15, 1927, to

EDWARD N. ROTH.

It is hereby certified that error appears in the printed specification of the above-numbered patent requiring correction as follows: Page 4, line 84, claim 9, for the word " point " read *joint;* and that the said Letters Patent should be read with this correction therein that the same may conform to the record of the case in the Patent Office.

Signed and sealed this 13th day of December, A. D. 1927.

[SEAL.]

M. J. MOORE,
*Acting Commissioner of Patents.*

Certificate of Correction.

Patent No. 1,649,616. Granted November 15, 1927, to

EDWARD N. ROTH.

It is hereby certified that error appears in the printed specification of the above-numbered patent requiring correction as follows: Page 4, line 84, claim 9, for the word "point" read *joint;* and that the said Letters Patent should be read with this correction therein that the same may conform to the record of the case in the Patent Office.

Signed and sealed this 13th day of December, A. D. 1927.

[SEAL.]

M. J. MOORE,
*Acting Commissioner of Patents.*